United States Patent [19]
Akiyama

[11] 3,763,751
[45] Oct. 9, 1973

[54] AUTOMATIC SHUTTER CONTROL CIRCUIT

[75] Inventor: Taiichi Akiyama, Okaya, Japan

[73] Assignee: Yashica Co., Ltd., Tokyo, Japan

[22] Filed: May 22, 1972

[21] Appl. No.: 255,400

Related U.S. Application Data

[63] Continuation-in-part of Ser. No. 835,523, June 23, 1969, abandoned.

[30] Foreign Application Priority Data

June 29, 1968 Japan.............................. 43/54779
June 29, 1968 Japan.............................. 43/54780
July 1, 1968 Japan.............................. 43/55012

[52] U.S. Cl. ............................................. 95/10 CT
[51] Int. Cl. ............................................. G03b 7/08
[58] Field of Search ............................... 95/10 CT

[56] References Cited
UNITED STATES PATENTS 3,470,798  10/1969  Miyakawa............................. 95/10
3,602,717  8/1971   Konig................................... 95/10 X
3,641,890  2/1972   Ono...................................... 95/10
3,678,826  7/1972   Mori et al.............................. 95/10

Primary Examiner—Samuel S. Matthews
Assistant Examiner—Michael L. Gellner
Attorney—Jacobs & Jacobs

[57] ABSTRACT

The present invention relates to an automatic camera shutter control circuit and more particularly to an automatic shutter or exposure control circuit for a T.T.L. type single lense reflex camera having a constant voltage circuit. The invention thus relates to an electric shutter circuit having a control circuit for maintaining constant the voltage between terminals of a photosensitive element which measures the amount of light from a photographed object and generally comprises improvements in information storage and retrieval, and especially to a circuit for the automatic timing of camera shutters in response to light sensed by a through-the-lens light measuring system.

24 Claims, 6 Drawing Figures

AUTOMATIC SHUTTER CONTROL CIRCUIT

The present application is a Continuation-in-Part of application Ser. No. 835,523, filed June 23, 1969, for "Memory Control Automatic Camera Shutter," now abandoned.

BACKGROUND OF THE INVENTION

The present invention relates to an automatic camera shutter control circuit. More particularly, the invention relates to an automatic shutter or exposure control circuit for a T.T.L. type single lens reflex camera having a constant voltage circuit. The invention relates to an electric shutter circuit having a control circuit for maintaining constant the voltage between terminals of a photosensitive element which measures the amount of light from a photographed object. Thus, the invention generally comprises improvements in information storage and retrieval, and, more particularly, to a circuit for the automatic timing of camera shutters in response to light sensed by a through-the-lens light measuring system.

As used herein, T.T.L. means through the taking lens. A T.T.L. type automatic exposure control single lens reflex camera with an electric shutter is known.

In the storage of information which has been converted into a correspondingly varying electrical parameter, it is common to utilize a memory circuit comprising a combination of a field effect type (F.E.T.) transistor of high input impedance and a memory capacitor. In a memory circuit of this type, however, the gate-source voltage of the field effect transistor is generally non-linearly related to the drain current due to the characteristics thereof, so that a gate input of a value to be stored undesirably tends to be in non-linear relationship with the corresponding drain output. Furthermore, when the drain current is utilized as a parameter to be stored, the drain current characteristic relative to the drain-source voltage tends to curve sharply in so-called triode range and pentode range (the curving point normally corresponds to an operative voltage of about 2 volts), so that such a field effect transistor cannot be used at a relatively low voltage. Field effect transistors, in addition, are non-uniform, depending on the individual products, in gate voltage relative to drain current pinch-off due to a construction peculiar to a transistor of this type, even if they are of the same model, and the non-uniformity with respect to this property is more pronounced than with respect to the other characteristic such as the vacuum tube characteristic. On the other hand, a leak in the capacitor or of the insulation of the distributing board combined with the field effect transistor is so high, although the input impedance thereof is high, that the field effect transistor generally fails to accomplish the desired function as a memory of this type.

SUMMARY OF THE INVENTION

The principal object of the present invention is to provide a highly reliable, improved storage or memory device utilizing a field effect transistor. It has usually been necessary that a battery supplying a higher operative voltage be utilized as a power source in an electric shutter mechanism having such a memory. It has also usually been necessary to provide a high order of amplification of the electrical information of illumination intensity of an object to be photographed, so that an electric shutter mechanism having a memory of the subject type may be useful for a wide range of light values. The large-sized battery and the high multiplicity of circuit elements, however, have resulted in a bulky mechanism which cannot be easily incorporated into a small-sized camera and is highly expensive.

Another object of the invention is to provide an automatic electric shutter control circuit of simple construction and capable of utilizing a small battery. In such shutter control circuit, any leakage current occurring in the timing capacitor or in the storage or memory capacitor would greatly adversely affect the correct control of exposure time, so that the leakage current involved in these capacitors would aggravate this effect and, particularly in the control of exposure, even a slight leakage current might considerably vary the exposure time to be controlled. Furthermore, it is very difficult in practice to completely avoid any leakage occurring in capacitors of this type since, even when an element of high input impedance such as a field effect transistor is utilized as a circuit element with the capacitors, the insulation resistance of members, such as a print base board on which each of the capacitors is mounted, a switch, or an insulator, is frequently lower than desired due to factors including atmospheric humidity. Consequently, in an electric shutter control circuit having a memory of conventional type, the control of exposure for a long time has been greatly limited.

Still another object of the invention is to provide an improved electric shutter control circuit in which any leakage current in the timing and memory capacitors may compensate one another, so that the exposures are and can be accurately controlled for long periods of time.

The invention provides a novel exposure control circuit which is able to operate on a short time storage or memorization of exposure control information. That is, the shutter control circuit of the invention is a practical circuit of high stability which automatically makes an exponential function of the brightness of the object accurately correspond to the shutter speed utilizing the principle of a constant voltage circuit.

In one sense the present invention contemplates a shutter control circuit comprising a negative feedback network including a first transistor and a variable resistance information member for producing a first signal responsive to the relationship of the resistances of the first transistor and the variable resistance information member. A second means produces a second signal. A third means produces a third signal reponsive to the difference between the first and second signals. An amplifier having a high input impedance and an output is provided. A storage or memory capacitor is connected to the input of the amplifier. The third signal is applied to the input of the amplifier. The output of the amplifier is coupled to the input of the transistor in a phase to form the negative feedback network.

In the automatic shutter timing circuit of the invention, a photoconductor and a timing capacitor are alternatively connected via a switch in series with a first transistor across a battery. The voltage difference between the voltage at the collector electrode of the transistor and an adjustable voltage derived from a voltage divider is applied to the base electrode of a second transistor whose output is derived from its collector electrode and is amplified and alternately applied to a shutter closure release controlling solid state switch and the gate of a field effect transistor. The source of the field effect transistor is connected to a point at ground potential through the resistance element of a potentiometer connected in series with a constant voltage diode. The potentiometer has a movable contact or electrode connected to the base electrode of the first transistor in inverse or negative feedback. A storage or memory capacitor is connected between the gate of the field effect transistor and the end terminal of the potentiometer remote from the source of th field effect transistor.

The control circuit of the invention is of simple structure, reliable and accurate in operation, and is not adversely affected by ambient conditions and non-linearity and non-uniformity of the solid state components.

DETAILED DESCRIPTION OF THE INVENTION

Figure 1:
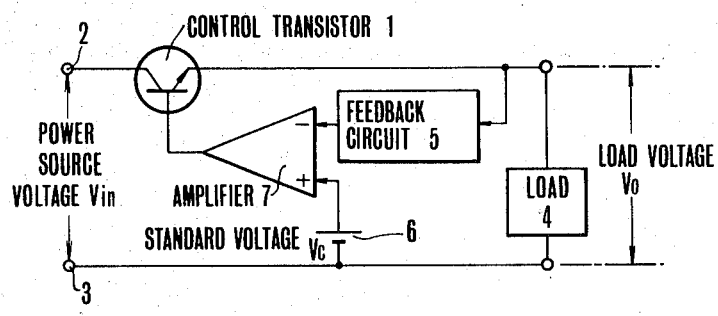
FIG. 1 is a block diagram illustrating the principle of operation of the automatic shutter control circuit of the invention.

In FIG. 1, a control component or transistor 1 controls a load voltage Vo and controls a signal obtained by amplifying a difference detected by comparing the load voltage Vo with a reference or standard voltage Vc applied to said control transistor. The load voltage Vo is controlled via a feedback circuit, or the like. The voltage control involves a power source voltage Vin applied to input terminals 2 and 3. The voltage Vo is applied to a load 4 via the control transistor 1.

When the load 4 varies and the load voltage Vo varies, the variation or varying position of the load voltage is detected by a feedback circuit 5. A standard voltage source 6 provides the standard voltage Vc. The signal produced by the feedback circuit 5 is compared with the standard voltage Vc. A signal representing the difference between the feedback signal and the standard voltage is amplified by an amplifier 7. The amplified signal is supplied to the transistor 1 and varies the output current of said transistor in a manner which maintains the voltage Vo of the load 4 constant. Thus, for any load fluctuation, the control transistor 1 controls the current flowing through the load by its output current, so that the load voltage Vo is maintained constant.

The invention utilizes the aforedescribed principle and utilizes a T.T.L. single lens reflex camera electric shutter in the embodiments of FIGS. 2, 3, 4 and 5.

Figure 2:
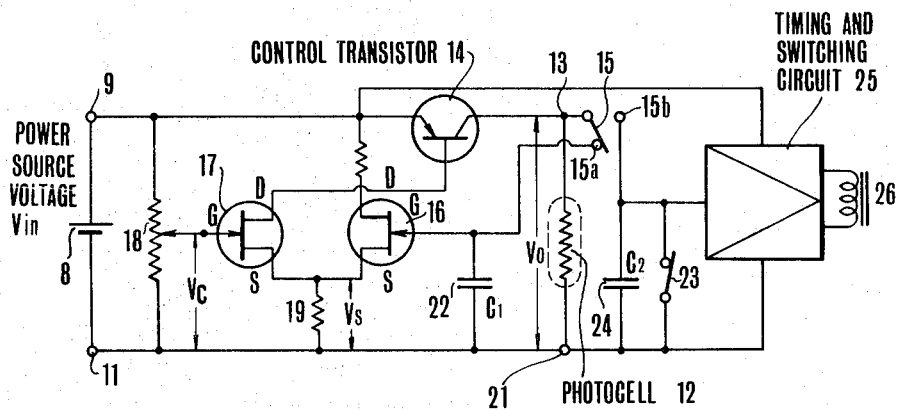
FIG. 2 is a circuit diagram of a first embodiment of the automatic shutter control circuit of the invention.

In the embodiment of FIG. 2, a stable electric battery or cell 8 is connected to input terminals 9 and 11 of a constant voltage circuit as a power source. A photocell or photoconductive element 12 is connected as a load to an output terminal 13 of a control transistor 14. A switch 15 connected to the terminal 13 of the load functions to close a contact 15a before the shutter is actuated for applying the voltage Vo across the load 12 to the gate of a first field effect transistor or F.E.T. 16. The first F.E.T. 16 detects the load voltage Vo.

The load voltage Vo determines the operating point by serving as a gate voltage. A second F.E.T. 17 having the same characteristics and performance as the first F.E.T. 16 is connected to said first F.E.T. as a differential amplifier. This differential amplifier 16, 17 has the important advantage that the amplification is very stable. This is due to the temperature characteristic of each F.E.T. being offset against the other because of its balanced operation simultaneously with the reversal of the amplified phase of both F.E.T.s. Furthermore, as referred to hereinafter, the differential amplifier of F.E.T.s 16 and 17 is advantageous because the equal phase noise which influences the shutter operation may be extinguished.

The balance type amplifier of F.E.T.s 16 and 17 controls the output current of the control transistor 14 by detecting the variation of the load voltage and a reference voltage, comparing such voltages, and amplifying the difference therebetween. The differential amplifier 16, 17 supplies the amplified signal to the base electrode of the control transistor 14. The power source voltage Vin is divided by a variable resistor 18 to provide the standard voltage Vc which is applied to the second F.E.T. 17 as the gate voltage. The standard voltage Vc and the load voltage Vo are maintained equal to each other by the balancing operation of the first and second F.E.T.s 16 and 17.

It is assumed that the resistance of the photoconductive element 12 varies with the variation in brightness of the object to be photographed. If, for example, the equivalent resistance of the photoconductive element 12 decreases, the load voltage Vo decreases and the output current of the first F.E.T. 16 decreases, since its gate voltage is decreased with respect to its source voltage Vs. Accordingly, the current flowing through a source resistor 19 is decreased and the source voltage Vs is decreased. Since Vo = RoIo, Vo decreases when Ro decreases and Io is constant. Ro is the load resistance and Io is the load current.

Since the F.E.T.s 16 and 17 have a common source, the output current of the second F.E.T. 17, that is, the drain current, increases when the source voltage Vs decreases relative to the reference voltage Vc. Vcs = Vc−Vs. When Vcs increases, drain current of 17 increases according to the characteristic of the F.E.T. Therefore, the base current of the control transistor 14 connected to the drain of the second F.E.T. 17, and accordingly the collector current, increases and the voltage across the terminals 13 and 21 of the photoconductive element 12 increases. In other words, the circuit operates to maintain a voltate Vc = Vo by increasing the load current when the load resistance decreases.

Although the foregoing description is for the case where the load current is decreased, the circuit of the invention operates to decrease the load current when said load current is increased by the operation of the control transistor 14.

Thus, in the circuit of FIG. 2, an output current corresponding to the equivalent resistance of the photoconductive element 12 is obtained in order to maintain the load voltage Vo constant at the output terminals 13 and 21 of the constant voltage circuit. This means that an output current is obtained which is responsive to the brightness of the object to be photographed. If a capacitor 22, having a capacitance C1, is connected in the feedback circuit of the constant voltage circuit to cut off the closed circuit, as shown in FIG. 2, and the connection at the output of the control transistor 14 is connected to said capacitance via the switch 15, an output current responsive to the load resistance is provided.

Since the capacitor 22 is connected to the gate of the first F.E.T. 16 and the switch 15 is connected at the output of the constant voltage circuit, the gate potential of said F.E.T. is maintained even when said switch is switched in connection from the contact 15a to the contact 15b. This is because the capacitor 22 is charged up to a voltage substantially equal to the constant load voltage Vo and it is maintained undischarged due to the high input resistance of the first F.E.T. 16.

The switch 15 is switched from the contact 15a to the contact 15b at the time of shutter release immediately before the mirror (not shown) is moved up. Consequently, an output current of the control transistor 14 proportional to the resistance of the photoconductive element 12, which has the same magnitude as that of the closed circuit, is obtained at the contact 15b of the switch 15. Then, when the mirror is moved up, the photocell 12 is shielded from the light and the equivalent resistance of the said photocell becomes indefinitely large and all the output current of the control transistor 14 flows through a trigger switch 23.

Accordingly, if the trigger switch 23 is opened simultaneously with the running of the leading diaphragm (not shown), which is a shutter or curtain, the time for charging a capacitor 24, having a capacitance C2, by the output current of the control transistor 14 is determined and the switching circuit operates to make the trailing diaphragm (not shown) which is also a shutter or curtain run, which determines the shutter speed by releasing the holding effect of the magnet for the trailing diaphragm. The exposure time or shutter speed is determined by the brightness of the object to be photographed. The resistance of the photocell 12 is determined by the brightness of the object to be photographed. The output current of the control transistor 14 in turn is proportional to the resistance of the photocell 12.

The desired shutter speed is provided by the capacitor 24 and a timing and switching circuit 25 connected thereto. The timing and switching circuit 25 controls the shutter (not shown) via a coil 26. The capacitor 24 is connected to the circuit via the switch 15 and its contact 15b.

The circuit of the invention thus makes it possible to automatically control the exposure, even when photometric operation is impossible due to the light shielding construction wherein the mirror is moved up. This is a known defect of an electric shutter in a single lens reflex camera of the T.T.L. type.

Figure 3:
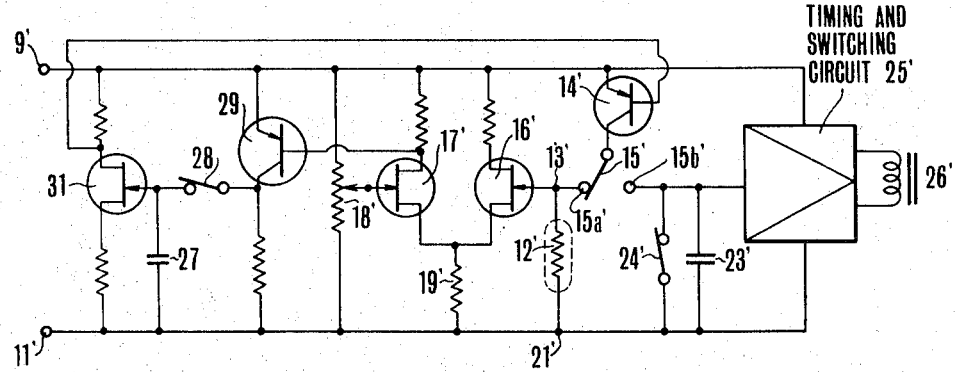
FIG. 3 is a circuit diagram of a second embodiment of the automatic shutter control circuit of the invention.

In the embodiment of FIG. 3, the gain of the difference amplification is increased in order to broaden the responsive range of the amount of light. In the embodiment of FIG. 3, a memory element comprising a capacitor 27 is provided in the constant voltage circuit embodying the basic principle of the invention. In FIG. 3, a switch 28 is provided for opening the closed circuit. The switch 15' takes out the output current of the control transistor 14'. The capacitor 23' and the timing and switching circuit 25' provide the desired shutter speed.

The circuit of FIG. 3 is similar to the circuit of FIG. 2, except that the gain of the feedback amplification and the difference amplification is increased and the capacitor 27 for maintaining a balanced condition is charged by the output current of a transistor 29. The transistor 29 is connected to the second F.E.T. 17' and is part of the differential amplifier 16', 17'. Furthermore, FIG. 3 includes a third F.E.T. 31 having a high input impedance. The third F.E.T. 31 is used with the output voltage serving as the feedback signal and its output is connected and supplied to the control transistor 14'.

In practical use, of course, a stable circuit is desired. In addition, as hereinbefore mentioned, it is also desired to increase the gain of the circuit to make the circuit responsive to a broad range of load variations in the amount of light from the object to be photographed. Especially when a field effect transistor is utilized, undesirable signals such as hum are apt to be generated when the amount of light from the object is small and the resistance of the photoconductive element is large. The balancing voltage of the capacitor 24 is influenced by these undesirable signals (FIG. 2) and results in shutter misoperation. In the balance type circuit of the invention, the undersirable in-phase signals constituting noise, such as hum, is able to be eliminated. Stable and reliable shutter control is provided by using differential amplification and increasing the ratio of the differential gain to the in-phase gain (Common Mode Rejection ratio).

In the constant voltage circuit of the invention, it will be readily understood that the exposure index can be changed by changing the value to the reference voltage Vc provided by the variable resistor 18, and accordingly, the change in film speed (ASA) and in the size of the diaphragm may be easily compensated.

Figure 4:
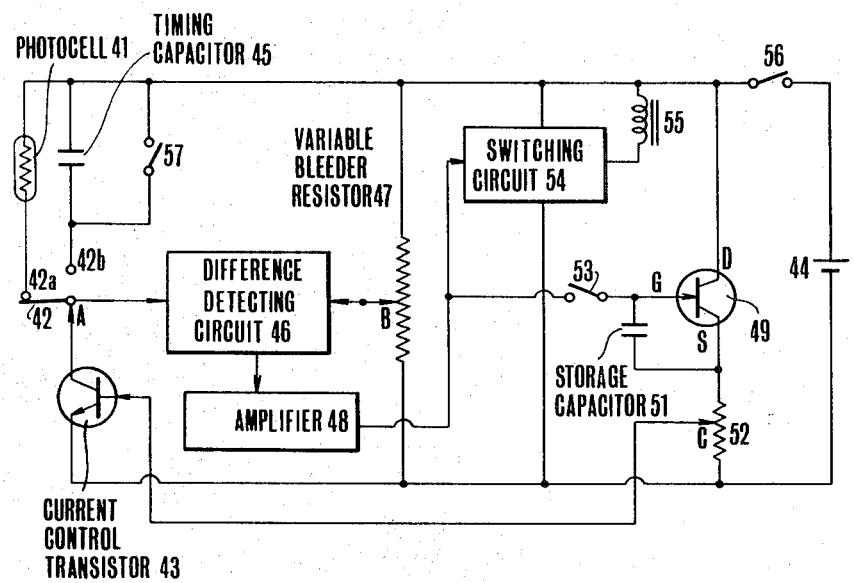
FIG. 4 is a block and circuit diagram of a third embodiment of the automatic shutter control circuit of the invention.

In the embodiment of FIG. 4, a photocell or photoconductor 41 is disposed in the path of light traversing the camera objective from the object to be photographed and is connected via a double throw changeover switch 42 to the collector electrode of a current control transistor 43. The emitter electrode of the current control transistor 43 is connected to the negative pole of a voltage source or battery 44 to provide an electric current in series through the photoconductor 41 and the collector-emitter path of the transistor 43. A timing capacitor 45 and the photocell 41 are alternately connected to the collector electrode of the transistor 43 as the switch 42 is operatively changed over to its opposite contacts 42a and 42b.

A deviated output or difference detecting circuit 46 is connected to the switch 42 at a circuit point A at which the collector voltage of the transistor 43 is provided. The difference detecting circuit 46 compares the transistor 43 collector voltage at circuit point A with another voltage of a voltage divider 47 provided at a circuit point B of the movable contact or electrode of said voltage divider. The voltage divider 47 functions as a bleeder resistor and is connected across the voltage source 44.

An amplifier 48 couples the output of the difference detecting circuit 46 to the gate of an F.E.T. 49. A storage or memory capacitor 51 is connected between the gate and source of the F.E.T. 49. An adjustable voltage dividing point C at the movable contact or electrode of a voltage divider 52 which connects the source of the F.E.T. 49 to the voltage source 44 is connected to the base electrode of the current control transistor 43. A switch 53 is connected between the amplifier 48 and the gate of the F.E.T. 49 and is in operative engagement with a suitable camera mechanism such as a mechanism for opening the shutter (not shown) in a manner whereby said switch is opened just before the start of the shutter release.

A switching circuit 54 controls an electromagnetic coil or winding 55 upon application of the output from the amplifier 48. The electromagnetic coil 55 initiates the closing of the shutter. A power source switch 56 is connected to The voltage source 44. A shunt switch 57 is connected in parallel with the timing capacitor 45.

In operation of the embodiment of FIG. 4, it is assumed that the photoconductor 41 is connected to the transistor 43 via the switch 42, and is exposed to light from the object to be photographed, and the switches 56, 53 and 57 are closed before the shutter release. A divided voltage of the voltage or power source 44 develops at the circuit point A dependent upon the resistance value of the photoconductor 41 corresponding to the illumination intensity of the incident light. The output of the difference detecting circuit 46 depends upon the difference between the voltage at the potential dividing circuit point B of the variable bleeder resistor 47 and the voltage at the circuit point A is applied via the amplifier 48 to the gate of the F.E.T. 49.

As a result, the internal resistance of the transistor 43, determining the voltage at the circuit point A, is shifted in a manner whereby the voltage between the circuit points A and B is reduced. More specifically, the drain current of the F.E.T. 49 depends upon the detected output and the voltage at the circuit point C of the source resistor 52. Thus, an equilibrium condition is immediately established between the circuit points A and B, and an electric charge corresponding to the output of the difference detecting circuit 46 is stored in the storage capacitor 51. When the storage operation is completed under this condition and the shutter release starts, the switch 53 is opened just before the start of the shutter release. The storage capacitor 51 is therefore no longer charged. Once the release operation has started, the storage capacitor 51 is free from any influence possible, even if the photoconductor 41 is blocked from the light traversing the objective.

The subsequent operation before the shutter releases actuates the switch 42 so that it contacts its contact 42b whereby the timing capacitor 45 is connected to the collector electrode of the transistor 43, instead of the photocell 41. The shutter (not shown) is then opened and opens the short-circuit switch 57. The transistor 43 accordingly controls the current passing therethrough in the same manner as before the shutter release under the control of the F.E.T. 49, which receives as a control signal between its gate and source the terminal voltage of the storage capacitor 51 depending upon the electric charge on said storage capacitor. Thus, the current controlled by the transistor 43 is fed to the timing capacitor 45 and is subject to a timing circuit operation by the control current of said transistor and the capacitance of said timing capacitor. The controlled current then passes through the difference detecting circuit 46 and the amplifier 48 and controls the operation of the switching circuit 54, which controls the operation of the electromagnetic coil 55 to time the closing of the shutter.

The switching circuit 54 of the embodiment of FIG. 4 is actuated whether the switch 53 is open or closed. While the entire arrangement is in a light measuring condition, that is, during the period required for the circuit points A and B to reach equilibrium, any action of the switching circuit 54 does not result in adverse effects on the movement of the shutter. The shutter is released after completion of the light measurement and storage operations, and the switch 53 opens just prior to the shutter release. A common shutter closes in response to a closing signal generated after the shutter opens. Accordingly, even if the switching circuit 54 is actuated and the shutter closing signal is generated before the shutter is released, that is, before the shutter opens, it has no effect on the movement of the shutter.

There is no difference between an F.E.T. and a common transistor, since the resistance value between the drain and source may be varied by gate voltage control. The term "gate voltage control" is used because the gate input impedance is extremely high. When a specific voltage is applied between the gate and source of the F.E.T. by a capacitor, the work of the F.E.T. may be maintained with small voltage consumption.

In the embodiment of FIG. 4, when the storage capacitor 51 is charged by the output of the amplifier 48, the voltage between the drain and the source of the F.E.T. 49 changes in response to the voltage between the terminals of said capacitor resulting from the charging of said capacitor. The output impedance of an F.E.T. is also high. If the output signal of the amplifier 48 to the storage capacitor 51 becomes higher than previously, said capacitor is additionally charged and the F.E.T. 49 is additionally changed. If the output signal of the amplifier 48 becomes lower than previously, the storage capacitor 51 is discharged through a transistor, hereinafter described with reference to FIG. 5, due to the amplifier utilized in the embodiment of FIG. 5, so that the electric charge may become equal to the output value. Thus, when the bridge circuit has equal voltage at the circuit points A and B, the F.E.T. 49 maintains its operation by a gate voltage applied by the storage capacitor 51. Even when the circuit point A has the same voltage as the circuit point B, the F.E.T. 49 is not cut off.

Figure 5:
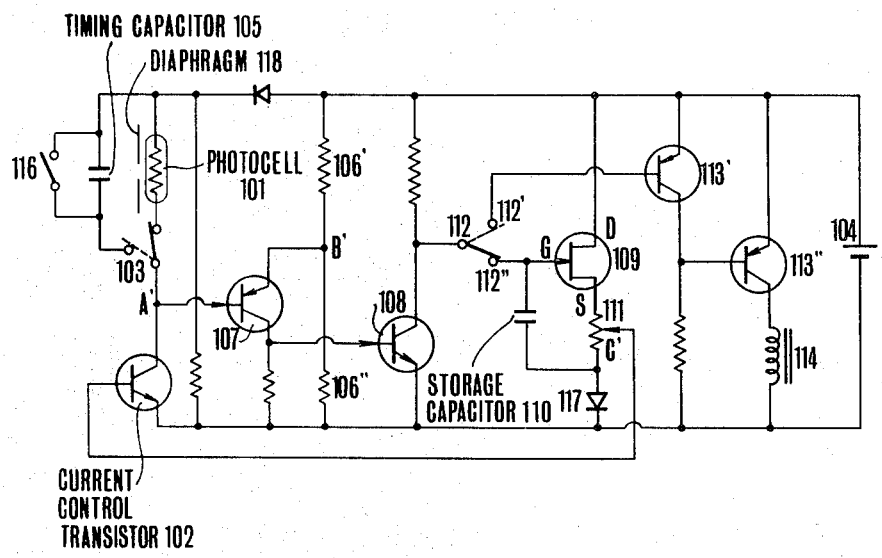
FIG. 5 is a circuit diagram of a fourth embodiment of the automatic shutter control circuit of the invention.

FIG. 5 illustrates an embodiment of the shutter control circuit of the invention for use in a single lens reflex camera as do FIGS. 2 and 3. In FIG. 5, a photosensitive element 101, such as, for example, a photocell or photoconductor, is disposed in the path of light traversing the objective from an object to be photographed. A bridge circuit comprises the photosensitive element 101, a transistor 102 and fixed resistors 106' and 106''. A difference detecting circuit 107, corresponding to the difference detecting circuit 46 of FIG. 4, comprises a transistor, and is connected to output terminals A' and B' of the bridge circuit. A transistor 108, corresponding to the amplifier 48 of FIG. 4, is connected to the output of the transistor 107. A timing capacitor 105 is selectively connected into the circuit via a changeover switch 103 alternately with the photosensitive element 101.

As in the embodiment of FIG. 4, a memory or storage circuit comprises an F.E.T. 109, a capacitor 110 and a source resistor 111. Feedback is provided by connecting a voltage dividing circuit point C' on the resistor 111 to the base electrode of the transistor 102. A shutter closure release electromagnet 114 is controlled by a solid state switching circuit, including transistors 113' and 113''. The input of the transistor 113'' is connected to the output of the transistor 113; and the input of the transistor 113' is connected to the normally open contact 112' of a make-and-break switch 112 which is series connected via its other terminal 112'' to the circuit for charging the storage capacitor 110. A short-circuit switch 116 is connected in parallel with the timing capacitor 105 in a manner whereby said switch is opened in response to the shutter opening operation.

A constant voltage diode 117 is connected in series between the source resistor 111 of the F.E.T. 109 and the negative polarity terminal of the power or voltage source 104, which may comprise a battery. An adjustable diaphragm 118 is arranged in front of the photosensitive element 101. The diaphragm 116 is so arranged that the stopping value thereof is adjustably set according to a parameter other than the illumination intensity of the object to be photographed, such as, for example, the sensitivity of film used and the present stopping value for a camera.

In the embodimnt of FIG. 5, the photosensitive element 101 is exposed to the light from the object to be photographed during exposure preparation, such as viewing the object, and the resistance value thereof corresponding to the illumination intensity on said photosensitive element, as reflected by the output at the terminals A' and B' of the bridge circuit, is detected by the transistor 107, amplified by the transistor 108 and applied to the storage capacitor 110. Thus, as in the embodiment of FIG. 4, the bridge circuit is stabilized with respect to the voltage across its output terminals A' and B' at a value corresponding to the illumination intensity of the object, since the F.E.T. 109 effectively controls the feedback current to the transistor 102 included in the bridge circuit.

During the first half of the depression path of the shutter release button, (not shown) the make-and-break switch 112 and the changeover switch 103 are changed over as shown by broken lines in FIG. 5. During this operation, the electromagnet coil or winding 114 is energized and functions to prevent the shutter (not shown) from being closed. During the completion of the depression of the shutter release button, the shutter opening is initiated and the short-circuit switch 116 is simultaneously opened. At this point, the timing capacitor 105 begins to be charged with the current controlled by the transistor 102. The transistor 102 is in turn controlled by the feedback storage or memory current under the control of the F.E.T. 109. When the terminal voltage of the timing capacitor 105 reaches a predetermined value, the transistors 107 and 108 operate as switching elements and are switched over to the conditions of the opposite phase at the instant of starting the release. The transistors 113' and 113'' are also reversed, cutting off the energization of the electromagnet winding 114. The shutter is therefore released from its locked open condition and is closed.

Figure 6:
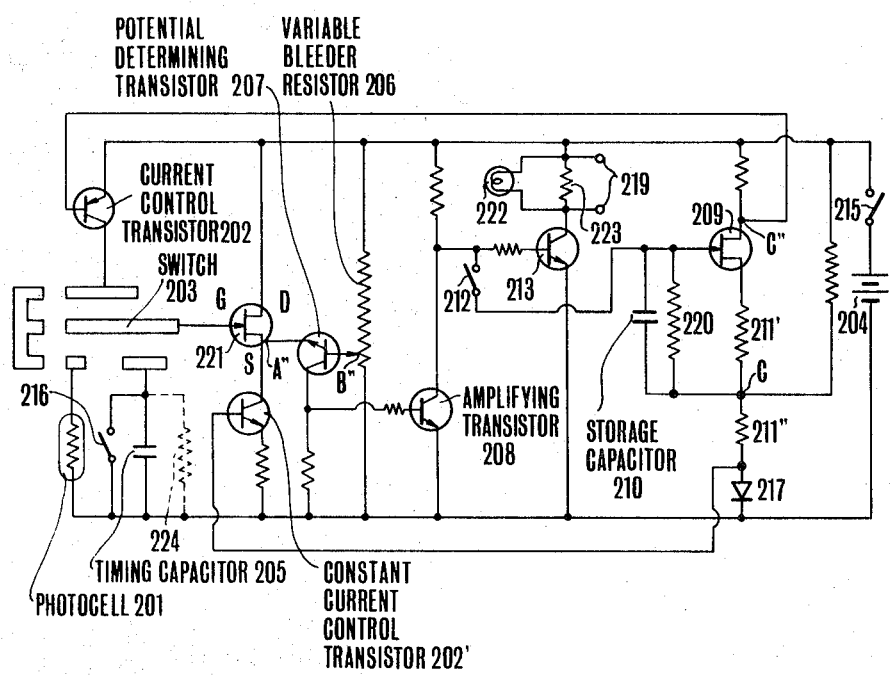
FIG. 6 is a circuit diagram of a fifth embodiment of the automatic shutter control circuit of the invention.

In the embodiment of FIG. 6, a photosensitive element 201 is located, as in the embodiments of FIGS. 4 and 5, in the path of light traversing the objective from an object to be photographed. A current control transistor 202 is series connected via a changeover switch 203 in the photoelectric circuit of the photosensitive element 201. A battery 204 functions as a power or voltage source. A timing capacitor 205 is connected in parallel with the photosensitive element 201 via the changeover switch 203. A first F.E.T. 221 has a gate to which the terminal voltage of the photosensitive element 201 and of the timing capacitor 205 are alternately applied via the switch 203. A constant current control transistor 202' is series connected to the source of the first F.E.T. 221.

A potential determining transistor 207 is connected between the movable contact or electrode of a variable bleeder resistor 206 at a circuit point B'' and a circuit point A'' connected to the source of the first F.E.T. 221 whereby a difference output of the transistor 207 is supplied via an amplifying transistor 208 to the base electrode of an output transistor 213 and to a storage or memory capacitor 210. The storage capacitor 210 is connected between the gate and the source of a second F.E.T. 209 via a source resistor 211' and a constant voltage diode 217 (which may be a Zener diode) series connected to the source of said second F.E.T., so that the source potential may be kept constant. A discharge resistor 220 is connected in parallel with the storage capacitor 210.

A negative feedback circuit derives a voltage responsive to the output of the second F.E.T. 209 from the drain of said second F.E.T., at a circuit point C'', and applies said voltage to the base electrode of the current control transistor 202. The negative feedback circuit also connects a common point in the connection between a resistor 211'' and the diode 217 to the base electrode of the constant current control transistor 202'. A switch 212 is series connected between the amplifying transistor 208 and the storage capacitor 210 and is operatively associated with the camera mechanism (not shown) in a manner whereby it is opened just before shutter release.

The closing of the shutter (not shown) is controlled via output terminals 219. A display lamp 222 may be series connected instead of a collector resistor 223 of the output transistor 213 or may be connected in parallel with said collector resistor. A short-circuit switch 216 is connected in shunt with the timing capacitor 205 and is opened synchronously with the opening of the shutter.

The embodiment of FIG. 6 operates as follows. As in the embodiments of FIGS. 4 and 5, when the changeover switch 203 is closed by the first half of the depression of the shutter button in a manner whereby the collector electrode of the transistor 202 is connected to the photosensitive element 201, a divided voltage of the battery 204 is applied to the gate of the first F.E.T. 221. The output of the potential determining transistor 207 is controlled by the difference voltage between the voltage at the source of the first F.E.T. 221 at the circuit point A'' corresponding to the divided voltage applied to the gate of said F.E.T., and the voltage at the circuit point B'' on the variable bleeder resistor 206. At this point, the transistor 202 functions as a constant current control element. The determined output is applied through the amplifying transistor 208 to the second F.E.T. 209 and, under the control of said second F.E.T., is fed back to the base electrode of the transistor 202. The transistor 202 therefore shifts in accordance with the determined output in such a manner that said transistor controls the current passing therethrough so that it shifts the voltage between the circuit points A'' and B''. An equilibrium condition is thus instantly established between the circuit points A'' and B''.

The storage capacitor 210 is charged an amount corresponding to the determined output of the transistor 207 at the instant of equilibrium. When the storage or memory operation is completed and the shutter release is initiated, the shutter release operation sequence is effected in the same manner as in the embodiments of FIGS. 4 and 5. During the shutter release control, the timing capacitor 205 considerably loses its characteristic of linear variation with respect to both the elapsed time, based on the charging current, and the value of the terminal voltage due to leakage current, which is shown in broken lines as an equivalent leakage resistor 224 connected in shunt with the timing capacitor, while the terminal voltage of the storage capacitor 210 gradually decreases due to the action of the discharge resistor 220.

The decrease in voltage of the storage capacitor 210 results in the shifting of the negative gate voltage on the second F.E.T. 209 in a positive direction, since the circuit point C'' at the source of said second F.E.T. is maintained constant by the constant voltage diode 217. Accordingly, the drain current of the second F.E.T. 209 gradually increases as time lapses, and the feedback current to the constant current control transistor 202' shifts further in the negative direction. Thus, the current through the current control transistor 202, that is, the charge current to the timing capacitor 205, gradually increases.

The storage capacitor 210 serves to maintain the gate voltage of the second F.E.T. 209, so that the capacitance thereof may be selected within a relatively wide range. Therefore, the capacitance of the storage capacitor 210 and the resistance value of the discharge resistor 220 may be properly selected in order that the variation in the drain current of the second F.E.T. 209 with time is adjusted in a manner whereby it compensates for the leakage current of the timing capacitor 205.

Although the leakage current can be compensated in the aforedescribed manner, shutter control via the aforedescribed circuit is impossible under light conditions in which the resistance value of the photosensitive element 201 exceeds the maximum resistance value of the current control elements such as the transistor 202. Such light conditions are beyond the limit within which photographing is possible. If the display lamp 222 is connected to the collector electrode of the output transistor 213 in the embodiment of FIG. 6, a voltage at the circuit point A'' is substantially equal to a voltage at the potential dividing circuit point B'' while the gate voltage of the second F.E.T. 209 is of slightly greater positive voltage range than the gate cutoff voltage, as far as the bridge circuit is maintained in equilibrium. The voltage at the circuit point C'' at the source terminal of the storage capacitor 210 for holding the gate voltage of the second F.E.T. 209 is properly selected whereby the output transistor 213 becomes conductive with the output of the amplifying transistor 208 under the aforedescribed equilibrium condition. The display lamp 222 is thus energized. The display operation indicates that the object to be photographed is of an illumination intensity within the range where exposure can be automatically adjusted and that the storage or memory operation has been completed.

On the other hand, under extremely low illumination conditions, resulting in a corresponding resistance value of the photosensitive element 201, if the transistor 202 cannot correspond to the resistance value despite the regulating operation by the feedback, due to dark current of said transistor, the voltage at the circuit point A'' maintains the positive voltage for a longer time than the voltage at the circuit point B'' does. The gate voltage of the second F.E.T. 209 is thus more negative than that under equilibrium conditions and also the base voltage of the output transistor 213 is within the negative range. The display lamp 222 is therefore deenergized.

In the embodiment of FIG. 6, therefore, the display lamp 222 indicates that a given object to be photographed is of an illumination intensity within the range where exposure can be automatically adjusted. It should be noted that an electromagnetic coil or winding may be utilized instead of the display lamp 222 as used in the embodiment of FIG. 6. The electromagnetic coil would operate to provide an indication display or a color display in a viewfinder.

While the invention has been described by means of specific examples and in specific embodiments, it is not limited thereto, for various modifications may be made without departing from the spirit and scope of the invention. Those elements or features referred to above as unillustrated are to be understood as per se known.

What is claimed is:

1. A shutter control circuit for the shutter of an automatic camera successively movable to open and closed positions defining an exposure sequence, said shutter control comprising shutter control means for opening and closing the shutter;

photosensitive means exposed to light when the shutter is in a light measuring phase and unexposed to light when the shutter is open;

circuit means connected to the photosensitive means for providing a first signal corresponding to a variation of the voltage across the photosensitive means due to a variation in the intensity of light impinging thereon;

reference voltage means for providing a reference voltage;

comparing means connected to the circuit means and to the reference voltage means for comparing the first signal and the reference voltage and for providing a different signal representing the difference between said first signal and said reference voltage; and control means coupling the comparing means
   a. to the shutter control means in accordance with the shutter position for controlling the shutter speed in accordance with the variation of the voltage across the photosensitive means;
   b. to the photosensitive means in accordance with the shutter position to control the voltage across said photosensitive means and thereby provide equilibrium between the voltage across the photosensitive means and the reference voltage; and
   c. information storage means coupled to the comparing means in accordance with the shutter position for storing a signal corresponding to the difference signal when the shutter is in a pre-exposure position and the photosensitive means is exposed to light and coupled to the shutter control means in accordance with the shutter position.

2. A shutter control circuit as claimed in claim 1, wherein the photosensitive means comprises a load and the circuit means comprises a feedback circuit connected to the photosensitive means for providing a feedback signal corresponding to a variation of the load voltage.

3. A shutter control circuit as claimed in claim 2, wherein the comparing means comprises a differential amplifier and amplifies the difference signal.

4. A shutter control circuit as claimed in claim 3, wherein the control means includes a control transistor.

5. A shutter control circuit as claimed in claim 4, wherein the photosensitive means comprises a photosensitive cell and the feedback means comprises a first field effect transistor and switching means for selectively connecting the first field effect transistor to the control transistor and to the photosensitive cell.

6. A shutter control circuit as claimed in claim 4, wherein the comparing means comprises a differential amplifier having a first field effect transistor and a second field effect transistor connected to said first field effect transistor.

7. A shutter control circuit as claimed in claim 6, wherein the first field effect transistor has a gate electrode connected via the switching means to the control transistor and to the photosensitive cell, a drain electrode coupled to the control transistor and a source electrode, and the second field effect transistor has a source electrode directly connected to the source electrode of the first field effect transistor, a drain electrode coupled to the control transistor and a gate electrode connected to the reference voltage means.

8. A shutter control circuit as claimed in claim 7, wherein the shutter control means includes timing means, and the information storage means comprises a capacitor connected to the timing means and connected to the control means via the switching means in accordance with the shutter position.

9. A shutter control circuit as claimed in claim 8, further comprising constant voltage means connected in the feedback circuit.

10. A shutter control circuit as claimed in claim 9, wherein the constant voltage means comprises another capacitor connected to the gate electrode of the first field effect transistor.

11. A shutter control circuit as claimed in claim 9, further comprising a second transistor connected to the drain electrode of the second field effect transistor and a third field effect transistor coupled to the second transistor and connected to the control transistor.

12. A shutter control circuit as claimed in claim 11, wherein the constant voltage means comprises another capacitor connected to the gate electrode of the third field effect transistor.

13. A shutter control circuit as claimed in claim 12, further comprising a switch connected between the seond transistor and the third field effect transistor for selectively opening the circuit.

14. A shutter control circuit, comprising
a storage network comprising a bridge circuit including outputs, a resistance section having a resistance which is adjustable according to information to be stored and a current control section adapted to be controlled according to feedback storage quantity;
a capacitor;
switch means;
a charging circuit for said capacitor connected through said switch means to an output of said bridge circuit;
a field effect transistor having an input connected to said capacitor and an output connected to said bridge circuit, said field effect transistor feeding back a controlled electricity quantity to the current control section of said bridge circuit; and
electrical determining means connected via said switch means to the resistance section of said bridge circuit.

15. A shutter control circuit as claimed in claim 14, further comprising a discharge resistor connected across said capacitor.

16. A shutter control circuit as claimed in claim 14, further comprising display means coupled to the bridge circuit for providing a display signal in response to the output of said bridge circuit.

17. A shutter control circuit having an electrical feedback photometric circuit for a camera comprising
a photosensitive means exposed to light passing through an objective lens when the camera shutter is in a photometric phase and unexposed to light when the shutter is opened;
a reference voltage means pre-adjusted in accordance with photographing parameters including a diaphragm or film sensitivity;
a comparing means for comparing a first signal determined corresponding to output of said photosensitive means with a second signal defined at said reference voltage means and for producing a third signal corresponding to said first and second signals;
a feedback coupling circuit for controlling its output corresponding to the produced third signal of said comparing means and for coupling its output to said photosensitive means in a photometric phase thereof;
an information storage means connected to said comparing means for maintaining output of said feedback coupling circuit corresponding to light incident on the photosensitive means prior to the opening of the shutter;
a shutter actuating circuit for determining exposure time applied to output of a control transistor determined in accordance with the information storage means when the shutter is opened; and
a coupling means for coupling a stabilized signal maintained by said information storage means to said shutter actuating circuit so as not to be influenced by the photosensitive means prior to its output being varied.

18. A shutter control circuit as claimed in claim 17, wherein said information member comprises a photoconductor.

19. A shutter control circuit as claimed in claim 18, further comprising a timing capacitor and switching means for alternately connecting said photo-conductor and said timing capacitor to said first transistor.

20. A shutter control circuit as claimed in claim 18, wherein said first and second means define a bridge circuit having a pair of legs including resistors and other legs each including a corresponding one of said photoconductors and said first transistor.

21. A shutter control circuit as claimed in claim 20, wherein at least one of the resistors of the bridge legs is variable.

22. A shutter control circuit as claimed in claim 17, further comprising a solid state switch, a shutter closure release member controlled by said solid state switch, and switching means for selectively opening said negative feedback network at said amplifier input and coupling said third means to the input of said solid state switch.

23. A shutter control circuit as claimed in claim 17, wherein said feedback network includes a bridge circuit including said first transistor and having opposite output terminals connected to the base and emitter electrodes of said first transistor.

24. A shutter control circuit as claimed in claim 17, further comprising a field effect transistor having a source electrode and a potentiometer having a resistance element connected in series with the source electrode of said field effect transistor and a movable contact connected to the base electrode of said first transistor.

* * * * *